US012686786B2

(12) United States Patent
Hirata et al.

(10) Patent No.: US 12,686,786 B2
(45) Date of Patent: Jul. 21, 2026

(54) COATING COMPOSITION, ADHESIVE OR NON-ADHESIVE COATING LAYER CONTAINING SAID COATING COMPOSITION, AND LAMINATE INCLUDING THESE COATING LAYERS

(71) Applicant: KJ CHEMICALS CORPORATION, Tokyo (JP)

(72) Inventors: Meiri Hirata, Tokyo (JP); Toshitsugu Kiyosada, Kumamoto (JP); Weikun Jin, Tokyo (JP)

(73) Assignee: KJ CHEMICALS CORPORATION, Tokyo (JP)

( * ) Notice: Subject to any disclaimer, the term of this patent is extended or adjusted under 35 U.S.C. 154(b) by 333 days.

(21) Appl. No.: 18/281,029

(22) PCT Filed: Mar. 7, 2022

(86) PCT No.: PCT/JP2022/009807
§ 371 (c)(1),
(2) Date: Sep. 8, 2023

(87) PCT Pub. No.: WO2022/191147
PCT Pub. Date: Sep. 15, 2022

(65) Prior Publication Data
US 2024/0158661 A1 May 16, 2024

(30) Foreign Application Priority Data
Mar. 11, 2021 (JP) ................................. 2021-039689

(51) Int. Cl.
*C09D 151/00* (2006.01)
*C09J 7/38* (2018.01)

(52) U.S. Cl.
CPC .......... *C09D 151/003* (2013.01); *C09J 7/385* (2018.01); *C09J 2203/318* (2013.01); *C09J 2203/326* (2013.01); *Y10T 428/2891* (2015.01)

(58) Field of Classification Search
None
See application file for complete search history.

(56) References Cited

U.S. PATENT DOCUMENTS

| | | | |
|---|---|---|---|
| 2010/0028669 A1* | 2/2010 | Habu | C09J 133/066 522/152 |
| 2013/0158199 A1* | 6/2013 | Iseki | C09J 133/14 525/123 |
| 2016/0137884 A1* | 5/2016 | Yamamoto | C09J 133/02 428/335 |
| 2017/0009001 A1* | 1/2017 | Takenouchi | C08G 18/672 |
| 2017/0166786 A1* | 6/2017 | Moon | C08F 265/06 |
| 2018/0044552 A1* | 2/2018 | Fujita | B32B 17/10697 |
| 2021/0102099 A1* | 4/2021 | Unverhau | C09J 133/10 |
| 2021/0147670 A1 | 5/2021 | Tsuchiya et al. | |

FOREIGN PATENT DOCUMENTS

| | | |
|---|---|---|
| EP | 3 388 457 | 10/2018 |
| JP | 1997-157417 A | 6/1997 |
| JP | 1999-293009 A | 10/1999 |
| JP | 2003-192811 A | 7/2003 |
| JP | 2016-501144 A | 1/2016 |
| JP | 2016-204597 A | 12/2016 |
| JP | 2018-178013 A | 11/2018 |
| JP | 2018-192699 A | 12/2018 |
| WO | 2011/013497 A1 | 2/2011 |
| WO | 2014/163100 A1 | 10/2014 |
| WO | 2018/101460 A1 | 6/2018 |
| WO | 2018/235217 A1 | 12/2018 |

OTHER PUBLICATIONS

Compound data sheet "Acrylic Acid", PubChem (Year: 2026).*
Compound data sheet "2-Ethylhexyl acrylate", PubChem (Year: 2026).*
Thermal Transitions of Homopolymers: Glass Transition & Melting Point, Millipore Sigma, 2026 (Year: 2026).*
International Search Report issued May 31, 2022 in International Bureau of WIPO Patent Application No. PCT/JP2022/009807 with an English translation thereof.
Written Opinion issued May 31, 2022 in International Bureau of WIPO Patent Application No. PCT/JP2022/009807 with an English translation thereof.
Supplementary European Search Report, dated Feb. 13, 2025, issued in EPO family member Patent Appl. No. 22767102.1.

* cited by examiner

*Primary Examiner* — Anish P Desai
(74) *Attorney, Agent, or Firm* — Greenblum & Bernstein, P.L.C.

(57) ABSTRACT

Coating compositions including 0.5 to 30.0% by mass of acrylic polymers (A) and 70.0 to 99.5% by mass of polymerizable compounds (B) are provided. The acrylic polymers (A) contain a branched alkyl group having 3 to 20 carbon atoms and/or a branched or unbranched alkenyl group having 3 to 20 carbon atoms in the side chain. The coating compositions can form non-adhesive coating layers with good adhesion to various resinous base materials excellent surface hardness, tack resistance, bending resistance, scratch resistance, shrinkage resistance and moisture heat resistance. The coating compositions also can form adhesive coating layers with excellent close adhesion, adhesiveness, transparency, contamination resistance, heat and moisture resistance, yellowing resistance, and step followability. Moreover, various laminates, cover films, cover substrates and the like having these coating layers on one side or both sides of the resin films and/or resinous base materials are provided.

13 Claims, No Drawings

COATING COMPOSITION, ADHESIVE OR NON-ADHESIVE COATING LAYER CONTAINING SAID COATING COMPOSITION, AND LAMINATE INCLUDING THESE COATING LAYERS

TECHNICAL FIELD

The present invention relates to a coating composition, adhesive or non-adhesive coating layer containing the coating composition, and laminate including these coating layers

BACKGROUND ART

Thin plate-shaped glass (glass substrate) excellent in transparency, hardness, heat resistance, and the like has been conventionally used as a surface material for displays, a touch panel member, and a material for electronic devices such as a liquid crystal display device and an organic electroluminescence display device. For example, it is used as a display element substrate for a display in which various electronic elements such as a thin transistor and a transparent electrode are formed on a glass substrate, or a cover substrate having a protective function which is installed on a surface of a display. Further, in order to improve display quality as a display, a pressure-sensitive adhesive is used for fixing a laminate of various optical films to a glass substrate of a liquid crystal display (LCD) cell, and a pressure-sensitive adhesive is also used for preventing cracking of a cover glass serving as a protective function and preventing scattering when the cover glass is cracked.

However, the glass substrate has problems in processability and operability such as being difficult to bend, being easily broken and has a drawback that it is heavy as compared with plastic products. Therefore, resin products such as resin substrates and resin films have been replacing glass products for strengthening the impact resistance of the panel itself, making it flexible, and making it thinner and lighter. From the viewpoint of processability and weight reduction studies have been conducted on resin products serving as glass substitute products. Particularly, fluorine-containing resin films, and polyimide films having excellent dimensional stabilities, insulating properties and heat resistance, have been actively used as insulating materials for electronic parts such as chip coating films in semiconductor devices and substrates of flexible printed wiring boards. In recent years, studies on resin products using polyimide resin having improved transparency have attracted particular attention as alternative products to glass.

On the other hand, when a resin product such as a resin-based film (also referred to as a resin-based material film or a resin film), a resin-based sheet (also referred to as a resin-based material sheet or a resin sheet), or a resin-based substrate (also referred to as a resin-based material substrate or a resin substrate) is used, it is necessary to use a pressure-sensitive adhesive between the resin sheet for a display element and the optical film laminate or between resin products such as a resin film, a resin sheet, and a resin substrate for a cover (surface protection) while conventional inexpensive and easy-to-handle acrylic pressure-sensitive adhesives have insufficient adhesion to these resin products, and new problems have arisen such as unsatisfactory blister resistance and reworkability. In particular, a fluorine-containing resin film or a polyimide film is not compatible with general-purpose adhesives or adhesive layers formed from adhesives and have a significant disadvantage of being difficult to adhere to, making it difficult to put them into practical use. Further, when these resin products are used as a cover substrate or a cover film having a protective function, they are excellent in processability as a material for a flexible display device, but they are insufficient in performance with respect to surface hardness and scratch resistance, so that they cannot be put into practical use.

It has been proposed to provide a hard coating layer on a surface (one surface or both surfaces) of a polyimide film for the purpose of protecting the surface of a resin-based material such as a polyimide film or improving surface hardness and scratch resistance. For example, Patent Literature 1 proposes forming a cured layer by applying a coating solution composed of a polyfunctional acrylate and a photoinitiator to the surface of a polyimide film and irradiating the coating solution with ultraviolet rays. Patent Literature 2 proposes forming a hard coating layer by applying a composition including a urethane acrylate hard coat agent in an amount of benzene ring content 50% by mass or more and a hard coat agent having epoxy skeleton to a polyimide film and photocuring the composition.

However, in the cured layer disclosed in Patent Literature 1, a hard coating layer having a high crosslinking density is easily formed by photopolymerization of a polyfunctional acrylate, and although the surface hardness of the polyimide film is improved, there is a problem that the adhesion between the hard coating layer and the polyimide film is poor. As a result, when the cured layer is used as a flexible material, there is a high possibility that cracks are generated in the hard coating layer, or the hard coating layer is peeled off from the polyimide film due to repeated bending. On the other hand, the hard coating layer disclosed in Patent Literature 2 is for protecting the polyimide film and it has good adhesion to the aromatic polyimide film, but does not refer to the surface hardness, scratch resistance, and bending resistance of the obtained polyimide film laminate. Further, it is apparent that the hard coating layer composition of Patent Literature 2 is not applicable to the formation of a flexible coating layer because the hard coating layer composition of Patent Literature 2 has a rigid benzene ring structure content of 50% by mass or more.

In addition, since poorly adhesive materials such as polyimide have low adhesion to general-purpose coating compositions or coating agents, low adhesion to other materials, and the like, a technique using a surface modifier (wet etching) and a technique combining a wet etching treatment and an ultraviolet light irradiation treatment have been studied for the purpose of improving the adhesion of film-like or sheet-like materials. For example, Patent Literature 3 describes a technique for improving adhesion of film surfaces by applying a surface-modifying agent containing aminoalcohol and ammonium salt to a polyimide film. Patent Literature 4 describes a technique in which a polyimide film is subjected to wet etching with oxygenated water, hypochlorite, or the like, and then irradiated with ultraviolet rays having wavelengths of 170 nm to 360 nm to modify the polyimide film surface. Patent Literature 5 describes a technique of modifying the surfaces of polyimide films by irradiating the polyimide films with a KrF excimer laser having a wavelength of about 250 nm under the presence of a first oxidizing agent such as oxygen or ozone, and then performing an etching treatment with a second oxidizing agent such as permanganate.

However, the adhesion of the polyimide film is not significantly improved by only wet etching, and there is a problem that the polyimide film cannot be stably used for a long period of time. Further, in the combination of the etching treatment and the ultraviolet irradiation treatment, a chemical treatment step such as etching and an ultraviolet irradiation step are required before the adhesive layer is provided, so that the operation is complicated and a special apparatus for generating a high-output laser is required. Furthermore, there is a possibility that not only the surface but also the inside of the polyimide film is partially altered by the irradiation with high-power laser light, and there remains a concern about a decrease in durability when the polyimide film is applied to optical and electronic devices.

As described above, it has been difficult for a polyimide film and a polyimide film laminate modified by using a conventional photocurable resin composition for hard coat to have both rigid properties such as surface hardness and scratch resistance and flexible properties such as flexibility and bending resistance. A film laminate having both rigidity and flexibility and having adhesion between a coating layer formed from a photocurable resin composition and a resin-based material film such as a polyimide film has not yet been proposed. In addition, in various resin films, resin sheets, and resin substrates including fluorine-containing resin and polyimides, a coating composition, a pressure-sensitive adhesive composition, and a pressure-sensitive adhesive layer having good adhesion to the resin surface while maintaining the original characteristics of the resin material without requiring excessive treatment or modification of the surface of the resin material are required. In particular, pressure-sensitive adhesive layers and adhesive sheets used for bonding display element substrates for various displays, cover substrates and various optical films are expected because they have both high adhesiveness and blister resistance to various resin-based material films, sheets, and the like, and have excellent step followability, moist heat resistance, and weather resistance.

CITATION LIST

Patent Literature

Patent Literature 1: JP 2016-501144 A
Patent Literature 2: JP 2018-192699 A
Patent Literature 3: JP 2003-192811 A
Patent Literature 4: JP 1999-293009 A
Patent Literature 5: JP 1997-157417 A

SUMMARY OF THE INVENTION

Problems to Solved by the Invention

An object of the present invention is to provide a coating composition capable of forming a coating layer having good transparency, yellowing resistance and curability, excellent surface hardness, tack resistance, scratch resistance, bending resistance, shrinkage resistance and moist heat resistance, and excellent adhesion to various resin films, resin sheets and resin substrates including fluorine-containing resin and polyimides, a non-adhesive coating layer and an adhesive coating layer (adhesive layer) formed from the coating composition, and various laminates and molded articles for optical and electronic devices including the coating layer on one or both sides of various resin substrates (films, sheets, plates and the like).

Solutions to the Problems

The present inventors conducted extensive studies and have found that a coating composition including 0.5 to 30.0% by mass of an acrylic polymer (A) and 70.0 to 99.5% by mass of a polymerizable compound (B), in which the acrylic polymer (A) has branched alkyl groups having 3 to 20 C atoms and/or branched or unbranched alkenyl in the side chains can solve the problem mentioned above; thus, have arrived at the present invention. By applying such a coating composition to various resin materials and performing thermal polymerization and/or polymerization with active energy rays such as light, a non-adhesive coating layer or an adhesive coating layer satisfying the above-mentioned characteristics can be obtained. Also, by providing these coating layers on one side or both sides of the resin film, sheet or substrate, it is possible to obtain a desired laminate, molded product, or the like.

That is, the present invention provides the following:

(1) A coating composition including 0.5 to 30.0% by mass of an acrylic polymer (A) and 70.0 to 99.5% by mass of a polymerizable compound (B), in which the acrylic polymer (A) has branched alkyl groups having 3 to 20 carbon atoms and/or branched or unbranched alkenyl groups having 3 to 20 carbon atoms in side chains.

(2) The coating composition according to the above (1), in which the acrylic polymer (A) has a weight-average molecular weight of 100,000 to 6,000,000 and a glass transition temperature (Tg) of $-85°$ C. to $40°$ C.

(3) The coating composition according to the above (1) or (2) above, in which the acrylic polymer (A) is (A1), or (A2) and/or (A3), (A1) further having an active hydrogen-containing functional group (R1) in a side chain, (A2) further having a functional group (R2) which can react with the active hydrogen-containing functional group (R1) in a side chain, and (A3) further having a (meth)acryloyl or unsaturated cycloaliphatic hydrocarbon group in a side chain.

(4) The coating composition according to any one of the above (1) to (3), in which the polymerizable compound (B) contains a monofunctional acrylic monomer (b1) and a polyfunctional acrylic monomer (b2), and the content of (b1) is 10.0 to 96.0% by mass based on the total coating composition, and the content of (b2) is 0 to 80.0% by mass based on the total coating composition.

(5) The coating composition according to any one of the above (1) to (4), in which the polymerizable compound (B) further contains a urethane oligomer (b3) (excluding b1 and b2), and the content of (b3) is 2.0 to 50.0% by mass based on the total coating composition.

(6) The coating composition according to the above (5), in which the urethane oligomer (b3) is a urethane (meth)acrylamide oligomer.

(7) A non-adhesive coating layer obtained by polymerizing the coating composition according to any one of the above (1) to (6) by light and/or heat.

(8) An adhesive coating layer obtained by polymerizing the coating composition according to any one of the above (1) to (6) with light and/or heat.

(9) An adhesive sheet including a film-like and/or sheet-like base material, and the coating layer according to the above (7) or (8) provided on one side or both sides of the base material.

(10) A laminate including a film-like and/or sheet-like base material, and the coating layer according to the above (7) or (8) provided on one side or both sides of the base material.

(11) An optical laminate including a film-like and/or sheet-like base material, and the coating layer according to the above (7) or (8) provided on one side or both sides of the base material, in which the optical laminate has a total light transmittance of 80% or more.

(12) A laminate for a flexible device, including a film-like and/or sheet-like base material, and the coating layer according to the above (7) or (8) on one side or both sides of the base material.

(13) A surface protective laminate including a film-like and/or sheet-like base material, and the coating layer according to the above (7) or (8) on one side or both sides of the base material.

(14) A laminate for display comprising a film-like and/or sheet-like substrate and the coating layer according to the above (7) or (8) on one side or both sides of the substrate.

(15) The laminate according to any one of the above (10) to (14), in which the film-like substrate is a film of any one kind selected from polyester film, polycarbonate film, fluorine-containing resin film, polyimide film, triacetylcellulose film, acrylic film, polystyrene film, polyvinyl chloride film, polyvinyl alcohol film, nylon film.

Effects of the Invention

The coating composition of the present embodiment contains an acrylic polymer (A) and a polymerizable compound (B) as essential components. Since the acrylic polymer (A) has branched alkyl groups having 3 to 20 carbon atoms and/or branched or unbranched alkenyl groups having 3 to 20 carbon atoms in the side chains, the coating layer itself has flexibility and water resistance in both the non-adhesive coating layer and the adhesive coating layer (adhesive layer) formed from the coating composition, and the bending resistance and moist heat resistance of various laminates and molded articles provided with such a coating layer are improved. Further, by combining the acrylic polymer (A) with the polymerizable compound (B), the coating composition exhibits excellent affinity (wettability) and adhesion to general-purpose resin-based materials such as polyester-based and polycarbonate-based base materials as well as hardly adhering fluorine-containing resin-based and polyimide-based base materials.

The polymerizable compound (B) can be used as a raw material monomer for the acrylic polymer (A), and in this case, even if the acrylic polymer (A) has a high molecular weight, it can be uniformly and stably dissolved in the polymerizable compound (B) to a molecular level, and a coating composition having extremely high transparency and a coating layer having good transparency and yellowing resistance can be obtained, and therefore, it can be suitably used as an optical member or an electronic device member.

Furthermore, it is preferable to use a (meth)acrylamide monomer as both the raw material monomer of the acrylic polymer (A) and the polymerizable compound (B). When a (meth)acrylamide monomer is used as the raw material monomer of acrylic polymer (A), many amide groups are present in the side chains of the polymer (A), and strong cohesive force is generated among the amide groups. The cohesive force derived from the amide groups and the interaction between the hydrophilic amide group and the hydrophobic main chain of the polymer A further improve the adhesion of the resulting coating layer. In addition, there is a feature that no adhesive residue or contamination of the adherend occurs when the adhesive coating layer is reworked. When a (meth)acrylamide monomer is used as the polymerizable compound (B), the polymerizability of the compound (B) is good, and the polymerizability and curability of the coating composition are high. Further, since the homopolymer of the (meth)acrylamide monomer has a high glass transition temperature, the obtained non-adhesive coating layer has excellent surface hardness, tack resistance and scratch resistance.

DESCRIPTION OF THE EMBODIMENTS

Hereinafter, embodiments of the present invention will specifically be described.

A first embodiment of the present invention is a coating composition (D). The coating composition (D) according to the present embodiment is a composition containing an acrylic polymer (A) and a polymerizable compound (B), in which the polymer (A) has branched alkyl groups having 3 to 20 carbon atoms and/or branched or unbranched alkenyl groups having 3 to 20 carbon atoms in the side chains. The coating composition (D) can form a coating layer by polymerization by heat (thermal polymerization), polymerization by an active energy ray such as light (photopolymerization), or polymerization by a combination of thermal polymerization and photopolymerization (hybrid polymerization). The coating layer can be formed by applying the coating composition to one surface or both surfaces of a film-like or sheet-like base material and then polymerizing the coating composition by the above-described various polymerization methods. A coating layer can be formed by polymerizing the coating composition by the above-described various polymerization methods, applying the coating composition in a solid state such as a powder state or in a solution state in the presence of a solvent or a polymerizable compound to one surface or both surfaces of a film-like or sheet-like base material, and treating the base materials with active energy rays such as electricity, heat or light. Furthermore, by adjusting the constitution of the coating composition, it is possible to easily obtain a non-adhesive coating layer applied to surface protection or topcoat, and an adhesive coating layer used as an adhesive or adhesive layer.

A second embodiment of the present invention is a coating layer having a crosslinked structure obtained by curing the coating composition (D). The crosslinked structure of the coating layer can be formed by thermal polymerization, polymerization by active energy rays such as light, or hybrid polymerization of the acrylic polymer (A) having branched or unbranched alkenyl groups (ethylenically unsaturated bonds) with 3 to 20 carbon atoms in the side chains and the polymerizable compound (B). The non-adhesive coating layer is preferably a crosslinkable non-adhesive coating layer because the surface hardness, strength, scratch resistance, and the like of the coating layer increase as the crosslinking density increases, and the coating layer is suitably used as a top layer coating film or a surface protective layer coating film. On the other hand, in the adhesive coating layer, blister resistance, weather resistance, heat resistance, contamination resistance and the like are improved by the formation of a crosslinked structure, and therefore, the adhesive coating layer is preferably a crosslinkable adhesive coating layer.

The acrylic polymer (A) may further have a functional group (R1) containing an active hydrogen or have a reactive functional group (R2) which can react with the functional group (R1) in the side chains, respectively referred to as acrylic polymer (A1) and acrylic polymer (A2). The acrylic polymer (A), acrylic polymer (A1) and acrylic polymer (A2) may be used alone or as a mixture of two or more thereof. When the acrylic polymer (A1) is used in the coating composition, if the polymerizable compound (B) contains the reactive functional group (R2), a crosslinked structure can be formed by thermal polymerization, polymerization by active energy rays such as light or hybrid polymerization of the chemical reactions between acrylic polymer (A1) and the polymerizable compound (B) (chemical reactions between the functional group (R1) and the functional group (R2)). Similarly, when the acrylic polymer (A2) is used, if the polymerizable compound (B) contains the functional group (R1), a crosslinked structure can be formed. Examples of the active hydrogen-containing functional group (R1) include hydroxyl groups, thiol groups, amino groups, and carboxyl, and examples of the functional group (R2) which reacts with R1 include isocyanate and glycidyl.

The acrylic polymer (A) may have a (meth)acryloyl or unsaturated cycloaliphatic hydrocarbon group in the side chain, which is referred to as acrylic polymer (A3). The (meth)acryloyl or unsaturated cycloaliphatic hydrocarbon group may be introduced from a raw material monomer of acrylic polymer (A3) or may be introduced via the functional group (R1) or (R2) after synthesis of acrylic polymer (A). When the acrylic polymer (A3) is used in the coating composition, a crosslinked structure can be formed by thermal polymerization, polymerization by an active energy ray such as light, or hybrid polymerization.

The raw material monomers of acrylic polymer (A) include (meth)acrylic monomer having a branched alkyl groups with 3 to 20 carbon atoms and/or branched or unbranched alkenyl groups with 3 to 20 carbon atoms.

Examples of (meth)acrylic monomers which is a raw material of acrylic polymer (A) include monomers having one type of unsaturated bond selected from methacrylate, acrylate, methacrylamide, and acrylamide groups in one molecule. Among the unsaturated bonds, one selected from an acrylate group, a methacrylate group and an acrylamide group is preferable from the viewpoint of easily obtaining a polymer having a relatively low glass transition temperature (hereinafter sometimes abbreviated as Tg) by use the monomer having these.

Examples of the branched alkyl groups having 3 to 20 carbon atoms include isopropyl, sec-butyl, tert-butyl, isobutyl, 1-methylbutyl, 2-methylbutyl, 1,1-dimethyl propyl, 1,1-dimethylbutyl, 2,2-dimethylbutyl, 3,3-dimethylbutyl, 2-ethylbutyl, isooctyl, tert-octyl, 2-ethylhexyl, isodecyl and the like.

Examples of the branched or unbranched alkenyl groups having 3 to 20 carbon atoms include allyl, 1-propenyl, 2-propenyl, 2-methyl-1-propenyl, 1-butenyl, 2-butenyl, 3-butenyl, 3-methyl-2-butenyl, 1,3-butadienyl, 1-pentenyl, 2-pentenyl, 3-pentenyl, 4-pentenyl, 4-methyl-3-pentenyl, 1-hexenyl, 2-hexenyl, 3-hexenyl, 5-hexenyl, heptenyl, octenyl, nonenyl, decenyl, undecenyl, dodecenyl, tetradecenyl, hexadecenyl, octa decenyl (oleyl group), eicosenyl, and docosenyl.

The (meth)acrylic monomer which is a raw material of the acrylic polymer (A) is not limited as long as it is a monomer having a structure constituted by combining one kind of unsaturated bonds arbitrarily selected from the above-mentioned various (meth)acrylic unsaturated bonds and one kind of substituents arbitrarily selected from the above-mentioned branched alkyl groups and/or branched or unbranched alkenyl groups having 3 to 20 carbon atoms.

The acrylic polymer (A) used in the present invention may be a homopolymer of one monomer arbitrarily selected from the group of (meth)acrylic monomer as a raw material, a copolymer of two or more monomers arbitrarily selected from the group, or a copolymer of one or more monomers arbitrarily selected from the group and another monomer (not included in the group). When the acrylic polymer (A) is a copolymer, the content of one or more monomers selected from the group is preferably 30 mol % or more, more preferably 50 mol % or more, and particularly preferably 80 mol % or more. When the content of one or more monomers selected from the group is 30 mol % or more, it is easy to adjust the Tg of the acrylic polymer (A) within a predetermined range (−85° C. to 40° C.), and it is possible to impart adhesiveness to a resin-based materials which is difficult to adhere.

The functional group (R1) possessed by acrylic polymer (A1) and the reactive functional group (R2) possessed by acrylic polymer (A2) may be introduced from the respective raw material monomers or may be introduced via a monomer having the functional group (R1) or (R2) after synthesis of acrylic polymer (A). The content of the monomer having the functional group (R1) or the functional group (R2) may be 20 mol % or less, preferably 10 mol % or less, more preferably 5 mol % or less against the total raw material monomers. When the content of the monomer having functional group (R1) or functional group (R2) is more than 20 mol %, the coating composition of the present embodiment may be less stable over time. In addition, there is a possibility that unreacted functional group (R1) or functional group (R2) may remain in the obtained coating layer, and as a result, there is a possibility that physical properties of the coating layer, various intended laminates, molded articles, and the like may change with time.

The total content of the (meth)acryloyl group and the unsaturated cycloaliphatic hydrocarbon group in the side chain of the acrylic polymer (A3) may be, on the raw material monomer basis, 20 mol % or less, preferably 10 mol % or less, more preferably 5 mol % or less against the total raw material monomers. When the total content of the (meth)acryloyl group and the unsaturated cycloaliphatic hydrocarbon group in the side chain of the acrylic polymer (A3) is more than 20 mol %, the coating composition of the present embodiment may be less stable over time. In addition, the cross-linking density of the resulting coating layer is too high, and the flexibility of the coating layer is lowered, and there is a possibility that the adhesiveness and bending resistance to hardly adhering resin-based materials cannot be satisfied.

The weight-average molecular weight of the acrylic polymer (A) is 100,000 to 6,000,000. It is preferably from 300,000 to 6,000,000, more preferably from 600,000 to 6,000,000. When the weigh-average molecular weight of the acrylic polymer (A) is 100,000 or more, the obtained coating composition and the coating layer formed from the composition have excellent adhesion to general-purpose resin-based materials such as polyester-based base materials, polycarbonate-based base materials or hardly adhering resin-based materials such as fluorine-containing resin-based and polyimide-based films and sheets, and at the same time have strong adhesion (also referred to as adhesion) between the coating layer and the base material, and can provide sufficient flexibility and bending resistance. The higher the molecular weight of the acrylic polymer (A), the higher the contamination resistance which is indispensable for reworking when used as an adhesive coating layer. It is considered that the higher the weight-average molecular weight of the acrylic polymer (A), the better, but it is difficult to synthesize the acrylic polymer (A) having a molecular weight exceeding 6,000,000.

The Tg of the acrylic polymer (A) is −85° C. to 40° C., preferably −80° C. to 25° C., and more preferably −70° C. to 10° C. When the Tg is in the range of −85° C. to 40° C., the coating composition can be easily applied uniformly on a film-like or sheet-like base material, and the coating layer formed from the composition can be easily adhered to the base material. As the Tg of the acrylic polymer (A) decreases, the adhesion to hardly adhering resin-based materials such as fluorine-containing resin-based and polyimide-based films and sheets, tends to improve.

When the acrylic polymer (A) is a copolymer, its glass transition temperature (Tg) is a value calculated on the basis of the known Fox equation. When the copolymer is composed of n monomer components of monomer 1, monomer 2, ~ monomer n, $$1/Tg = W1/Tg1 + W2/Tg2 + \sim Wi/Tgi$$

(in which, Tg is the glass transition temperature (unit: K) of the copolymer, Tgi (i=1, 2, ~n) is the glass transition temperature (unit: K) when the monomer i forms a homopolymer, and Wi (i=1, 2, ~n) is the weight fraction of the monomer i in all monomer components. In the present specification, "the glass transition temperature when a homopolymer is formed" means "the glass transition temperature of a homopolymer of the monomer".

The polymerizable compound (B) contains a monofunctional acrylic monomer (b1) having one type and only one unsaturated bond in one molecule and a polyfunctional acrylic monomer (b2) having one or more type unsaturated bonds and two or more unsaturated bonds in one molecule. The unsaturated bonds possessed by the monofunctional acrylic monomer (b1) and the polyfunctional acrylic monomer (b2) are one or more selected from methacrylate, acrylate, methacrylamide, and acrylamide.

The monofunctional acrylic monomer (b1) preferably contains a monofunctional acrylic monomer having a homopolymer glass transition temperature (Tg) of 10° C. or less and a monofunctional acrylic monomer having a homopolymer Tg of more than 60° C. By combining a monofunctional acrylic monomer having a homopolymer Tg of 10° C. or less and a monofunctional acrylic monomer having a homopolymer Tg of more than 60° C., the Tg of the acrylic polymer (A) can be easily adjusted within a predetermined range, transparency and curability by active energy rays such as heat or light of the coating composition containing the acrylic polymer (A) are easily improved, surface hardness (rigidity) and bending resistance (flexibility) of the obtained coating layer are more easily compatible, the balance between the adhesion of the non-adhesive coating layer to hardly adhering base materials and tack resistance and surface hardness are more easily adjusted, and the balance between the adhesion of the adhesive coating layer to hardly adhering base materials and adhesiveness and contamination resistance (reworkability) of the adhesive coating layer are more easily adjusted.

An example of the monofunctional acrylic monomer having a homopolymer Tg of 10° C. or less is methoxydipropyleneglycolacrylate (Tg=−44° C.), methoxytriethyleneglycolacrylate (Tg=−50° C.), methoxypolyethyleneglycolacrylate (Mw=400) (Tg=−71° C.), methoxytripropyleneglycolacrylate (Tg=−75° C.), phenoxyethylacrylate (Tg=−22° C.), methylacrylate (Tg=8° C.), ethylacrylate (Tg=−22° C.), butylacrylate (Tg=−54° C.), 2-ethylhexylacrylate (Tg=−85° C.), octylacrylate (Tg=−65° C.), nonylacrylate (Tg=−58° C.), dodecylacrylate (Tg=−3° C.), isodecylacrylate (Tg=−62° C.), isostearylacrylate (Tg=−18° C.), tridecylacrylate (Tg=−75° C.), 2-ethylhexylmethacrylate (Tg=−10° C.), octylmethacrylate (Tg=−20° C.), dodecylmethacrylate (Tg=−65° C.), 2-hydroxyethylacrylate (Tg=−15° C.), 2-hydroxypropylacrylate (Tg=−7° C.), 4-hydroxybutylacrylate (Tg=−40° C.), methoxyethylacrylate (Tg=−50° C.), ethoxyethylacrylate (Tg=−50° C.), methoxybutylacrylate (Tg=−56° C.), 3-methoxypropylacrylate (Tg=−75° C.), butoxyethylacrylate (Tg=−40° C.), phenoxydiethyleneglycolacrylate (Tg=−25° C.), dicyclopentenyloxyethylacrylate (Tg=10° C.), tetrahydrofurfurylacrylate (Tg=−12° C.), the like. These monofunctional acrylic monomers having a homopolymer Tg of 10° C. or less may be used alone or in combination of two or more thereof.

An example of a monofunctional acrylic monomer having a homopolymer Tg of 60° C. or more is isobornylacrylate (Tg=94° C.), cyclohexylmethacrylate (Tg=66° C.), 2-hydroxyethylmethacrylate (Tg=71° C.), 4-tert-butylcyclohexylacrylate (Tg=81° C.), dicyclopentenylacrylate (Tg=120° C.), dicyclopentanylacrylate (Tg=120° C.), acryloylmorpholine (Tg=145° C.), N,N-dimethylacrylamide (Tg=119° C.), N,N-diethylacrylamide (Tg=81° C.), N-(2-hydroxyethyl) acrylamide (Tg=98° C.), N-isopropylacrylamide (Tg=134° C.), acrylamide (Tg=153° C.), methacrylamide (Tg=77° C.), diacetoneacrylamide (Tg=77° C.), N-methylacrylamide (Tg=130° C.), N-methylmethacrylamide (Tg=65° C.), N-ethylacrylamide (Tg=100° C.), N-octylacrylamide (Tg=79° C.), acrylicacid (Tg=106° C.), the like. These monofunctional acrylic monomer of which Tg of homopolymer exceeds 60° C. may be used alone or in combination of two or more thereof.

Examples of the polyfunctional acrylic monomer (b2) include alkyleneglycoldi(meth)acrylate, polyalkyleneglycoldi(meth)acrylate, polyester di(meth)acrylate, polycarbonate di(meth)acrylate, pentaerythritoltri(meth)acrylate, pentaerythritoltetra(meth)acrylate, trimethylolpropanetri (meth)acrylate, dipentaerythritoltri(meth)acrylate, dipentaerythritoltri(meth)acrylate, ditrimethylolpropanetetra (meth)acrylate, dipentaerythritolpenta(meth)acrylate, dipentaerythritolhexa(meth)acrylate, tri(meth)acryloyloxyethoxytrimethylolpropane, glycerinpolyglycidyletherpoly (meth)acrylate, isocyanuric acid ethyleneoxide-modified tri (meth)acrylate, ethyleneoxide-modified dipentaerythritol penta(meth)acrylate, ethyleneoxide-modified dipentaerythritol Hexa(meth)acrylate, ethyleneoxide-modified pentaerythritoltri(meth)acrylate, ethyleneoxide-modified pentaerythritoltetra(meth)acrylate, succinic acid-modified pentaerythritoltri(meth)acrylate. These polyfunctional acrylic monomers (b2) may be used alone or in combination of two or more thereof.

The coating composition of the present embodiment contains 0.5 to 30.0% by mass of the acrylic polymer (A) and 70.0 to 99.5% by mass of the polymerizable compound (B). When the contents of the acrylic polymer (A) and the polymerizable compound (B) are within these ranges, the obtained coating composition and the coating layer formed from the coating composition have good adhesion to a base material in the form of a film, a sheet, or the like, and can be suitably used in various applications. In addition, although depending on the molecular weight of the acrylic polymer (A), when the acrylic polymer (A) is contained in an amount of 0.5% by mass or more, even if a coating layer having a crosslinked structure is formed from the coating composition by various polymerization reactions, the formed coating layer is not easily peeled off from the base material and has high bending resistance because the adhesion to the base material is good and cure shrinkage is low. From the viewpoint of further improving the surface hardness and scratch resistance of the resulting non-adhesive coating layer and laminate, the coating composition preferably contains 0.5 to 25.0% by mass of the acrylic polymer (A) and 75.0 to 99.5% by mass of the polymerizable compound (B), and more preferably contains 1.0 to 20.0% by mass of the acrylic polymer (A) and 80.0 to 99.0% by mass of the polymerizable compound (B). Moreover, from the viewpoint of further improving the contamination resistance and step followability of the resulting adhesive coating layer and laminate, the coating composition preferably contains 1.0 to 30.0% by mass of the acrylic polymer (A) and 70.0 to 99.0% by mass of the polymerizable compound (B), and more preferably contains 2.0 to 25.0% by mass of the acrylic polymer (A) and 75.0 to 98.0% by mass of the polymerizable compound (B).

The polymerizable compound (B) contains one or more monofunctional acrylic monomers (b1) and one or more polyfunctional acrylic monomers (b2). The content of the monofunctional acrylic monomer (b1) is preferably 10.0 to 95.0% by mass with respect to the entire coating composition (D), and the monofunctional acrylic monomer (b1) has an effect of improving compatibility between the acrylic polymer (A) and the polyfunctional acrylic monomer (b2), and when the content is 10.0% or more by mass, the transparency of the coating composition (D) and the transparency and yellowing resistance of the cured coating layer are good. When the content of the monofunctional acrylic monomer (b1) is 95.0% by mass or less, the contents of the acrylic polymer (A) and the polyfunctional acrylic monomer (b2) in the coating composition (D) can be easily adjusted. When the content of the polyfunctional acrylic monomer (b2) is 80.0% by mass or less, it is easy to adjust the contents of the acrylic polymer (A) and the monofunctional acrylic monomer (b1) in the coating composition (D) according to the purpose, and the obtained coating layer has good cure shrinkage resistance and bending resistance, which is preferable.

In the coating composition used for the non-adhesive coating layer and the laminate, the content of the monofunctional acrylic monomer (b1) is more preferably from 15.0 to 80.0% by mass, and particularly preferably from 20.0 to 60.0% by mass, from the viewpoint of further improving the adhesiveness and bending resistance of the obtained non-adhesive coating layer and laminate. The content of the polyfunctional acrylic monomer (b2) is preferably from 2.0 to 80.0% by mass, more preferably from 5.0 to 60.0% by mass, and particularly preferably from 10.0 to 50.0% by mass, from the viewpoint that the coating composition (D) can be rapidly cured, and the obtained coating layer can sufficiently satisfy rigidity characteristics such as surface hardness, tackiness resistance, and scratch resistance.

In the coating composition used for the adhesive coating layer and the laminate, the content of the monofunctional acrylic monomer (b1) is more preferably 30.0 to 80.0% by mass, and particularly preferably 45.0 to 70.0% by mass, from the viewpoint of further improving the wettability and the pressure-sensitive adhesiveness to the base material. In addition, the content of the polyfunctional acrylic monomer (b2) is more preferably 0.5 to 20.0% by mass, and particularly preferably 0.5 to 10.0% by mass, from the viewpoint of being able to improve contamination resistance, moist heat resistance of the adhesive coating layer to be obtained and maintaining good pressure-sensitive adhesiveness. The content of the polyfunctional acrylic monomer (b2) is most preferably 1.0 to 5.0% by mass or less from the viewpoint of sufficiently satisfying adhesiveness to a hardly adhering base material and step followability.

The polymerizable compound (B) may further contains a urethane oligomer (b3) other than the monofunctional acrylic monomer (b1) and the polyfunctional acrylic monomer (b2). The urethane oligomer (b3) is a polyfunctional urethane oligomer having one or more type of unsaturated bonds, two or more unsaturated bonds and having a urethane bond. The unsaturated bonds of the urethane oligomer (b3) are one or more selected from methacrylate, acrylate, methacrylamide, and acrylamide. When the urethane oligomer (b3) has one or more methacrylamide or acrylamide as unsaturated bonds in the molecules, that is, when the urethane oligomer (b3) is a urethane (meth)acrylamide oligomer, the curability of the coating composition (D) is improved, and at the same time, cure shrinkage at the time of curing the coating composition (D) by various polymerization methods is low, and a coating layer having sufficient shrinkage resistance is obtained, which is preferable.

The urethane oligomer (b3) can be obtained by a known urethanization method using polyols, a (meth)acrylate having polyisocyanate and a hydroxyl group, and/or (meth)acrylamide having a hydroxyl group. The urethane oligomer (b3) has one or more polyol derived skeletons selected from ether skeleton, ester skeleton, carbonate skeleton, silicone skeleton, olefin skeletons and acrylate skeleton. From the viewpoint of improving the curability of the coating composition (D), the number of unsaturated bonds of the urethane oligomer (b3) is preferably two or more, and is usually 10 or less, preferably 6 or less, and more preferably 4 or less from the viewpoint of achieving both rigidity and flexibility of the obtained coating layer.

The average molecular weight (Mw) of the urethane oligomer (b3) is preferably 1,500 to 100,000, and more preferably 2,000 to 50,000. When the Mw of the urethane oligomer (b3) is within this range, the coating composition (D) has good wettability and adhesion to various base materials, the obtained coating layer has high adhesion from general-purpose resin base materials to hardly adhesive base materials, and laminates, molded articles, and the like formed from such a coating layer have sufficient bending resistance and moist heat resistance.

The content of the urethane oligomer (b3) is preferably 2.0 to 50.0% by mass with respect to the entire coating composition (D). When urethane oligomer (b3) is contained in an amount of 2.0% or more by mass, an improvement in curability of the coating composition and an improvement in compatibility between rigidity and flexibility of the obtained coating layer are recognized. On the other hand, when the content of urethane oligomer (b3) is more than 50.0% by mass, there is a concern that the moist heat resistance of the cured coating layer, the target laminate, or the molded article may decrease. When used in a non-adhesive coating layer and a laminate, the content of urethane oligomer (b3) is more preferably 2.0 to 35.0% by mass, and particularly preferably 5.0 to 20.0% by mass, from the viewpoint of further improving adhesiveness and bending resistance. When the coating composition is used in an adhesive coating layer and a laminate, the content is more preferably 5.0 to 50.0% by mass, and particularly preferably 10.0 to 30.0% by mass, from the viewpoint of further improving the adhesiveness (adhesive force) and contamination resistance.

The coating composition (D) can be polymerized by thermal polymerization, photopolymerization or hybrid polymerization. In the case of thermal polymerization, it is preferable to use a thermal polymerization initiator. In the case of polymerization (photopolymerization) by an active energy ray such as light, when an electron beam is used as the active energy ray, it is not necessary to use a photopolymerization initiator, but when ultraviolet rays, visible rays, or the like are used, it is preferable to use a photopolymerization initiator. In the case of hybrid polymerization, a thermal polymerization initiator and a photopolymerization initiator may be used in combination. When the coating composition contains an acrylic polymer (A1) having an active hydrogen-containing functional group (R1) and the acrylic polymer (A2) having a functional group (R2) capable of reacting with the functional group (R1) in the side chains, the composition can be cured by polymerizing the polymerizable compound (B) with a photopolymerization initiator and then heating to react the functional groups R1 and R2. When the coating composition contains the acrylic polymer (A3) having a (meth)acryloyl group or an unsaturated alicyclic hydrocarbon group in the side chains, the composition may be cured by copolymerizing the acrylic polymer (A3) and the polymerizable compound (B) with a photopolymerization initiator, or by photopolymerizing the polymerizable compound (B) with a photopolymerization initiator and then copolymerizing the acrylic polymer (A3) with the thermal polymerization initiator.

The thermal polymerization initiator may be appropriately selected from commonly used ones such as azo-based initiators, peroxide-based initiators, persulfate initiators and redox-based initiators. Examples of the azo-based initiator include, for example, VA-044, VA-46b, V-50, VA-057, VA-061, VA-067, VA-086, 2,2'-azobis(4-methoxy-2,4-dimethylvaleronitrile) (VAZO 33), 2,2'-azobis(2-amidinopropane)dihydrochloride (VAZO 50), 2,2'-azobis(isobutyronitrile) (VAZO 64), 2,2'-azobis-2-methylbutyronitrile (VAZO 67), 1,1-azobis(1-cyclohexane carbonitrile) (VAZO 88) (both available from DuPont Chemical Co., Ltd), 2,2'-azobis (2-cyclopropylpropionitrile), 2,2'-azobis(methylisobutyrate) (V-601), 2,2'-azobis(2,4-dimethylvaleronitrile) (V-65) (available from Wako Pure Chemical Industries, Ltd), and the like. Peroxide initiators include, for example, benzoylperoxide, acetylperoxide, lauroylperoxide, decanoylperoxide, dicetylperoxydicarbonate, di(4-t-butylcyclohexyl)peroxydicarbonate (Perkadox 16S) (available from Akzo Nobel), di(2-ethylhexyl)peroxy dicarbonate, t-butylperoxypivalate (Lupersol 11) (available from Elf Atochem), t-butylperoxy-2-ethylhexanoate (Trigonox21-C50) (available from Akzo Nobel), dicumylperoxide and the like. Examples of the persulfate initiator include potassium persulfate, sodium persulfate, ammonium persulfate and the like. Redox-initiators include, for example, combinations of the persulfate initiators with reducing agents such as meta sodium hydrogensulfite and sodium hydrogensulfite, systems based on the organic peroxide and tertiary amines (e.g., systems based on benzoylperoxide and dimethylaniline), systems based on organic hydroperoxide and transition metals (e.g., systems based on cumene hydroperoxide and cobalt naphthate), and the like. These thermal polymerization initiators may be used alone or in combination of two or more thereof.

The content of the thermal polymerization initiator is preferably 0.1 to 10% by mass with respect to the entire coating composition (D). In addition, 0.5 to 5% by mass is more preferable, and 1.0 to 3% by mass is particularly preferable.

The photopolymerization initiator may be appropriately selected from commonly used ones such as acetophenone series, benzoin series, benzophenone series, α-aminoketone series, xanthone series, anthraquinone series, acyl phosphine oxide series, and polymer photopolymerization initiator series. For example, acetophenone series include diethoxy acetophenone, 2,2-dimethoxy-1,2-diphenylethan-1-one, 2-hydroxy-2-methyl-1-phenylpropan-1-one, 1-(4-isopropylphenyl)-2-hydroxy-2-methyl propan-1-one, 4-(2-hydroxyethoxy)-phenyl-(2-hydroxy-2-propyl)ketone, 1-hydroxycyclohexylphenyl ketone, and 2-methyl-1-(4-methylthiophenyl)-2-morpholino propane-1; benzoin series include benzoin, α-methylbenzoin, α-phenylbenzoin, α-allylbenzoin, α-benzoylbenzoin, benzoin methylether, benzoin ethylether, benzoin isopropylether, benzoin isobutylether and benzyldimethyl ketal; benzophenone series includes benzophenone, benzoylbenzoic acid, benzoylbenzoic acid methyl; α-aminoketone series includes 2-methyl-1-(4-methylthiophenyl)-2-(4-morpholinyl)-1-propanone, 2-benzyl-2-(dimethylamino)-1-(4-(4-morpholinyl)phenyl)-1-butanone, 2-(dimethylamino)-2-(4-methylphenyl)methyl-1-(4-(4-morpholinyl)phenyl)-1-butanone; xanthone series includes xanthone, thioxanthone, anthraquinone includes, anthraquinone, 2-methyl anthraquinone, 2-ethyl anthraquinone; acyl phosphine oxide series includes bis(2,4,6-trimethylbenzoyl)-phenyl phosphine oxide, 2,4,6-trimethylbenzoyl-diphenyl-phosphine oxide; polymer photopolymerization initiator series include 2-hydroxy-2-methyl-1-(4-(1-methyl vinyl)phenyl)propan-1-one polymers and the like. These photopolymerization initiators may be used alone or in combination of two or more thereof.

The content of the photopolymerization initiator is preferably 0.01 to 10% by mass with respect to the entire coating composition (D). In addition, 0.1 to 5% by mass is more preferable and 0.5 to 3% by mass is particularly preferable.

The coating composition (D) may not contain a solvent but may contain a solvent or various additives as necessary. The solvent is not particularly limited as long as it can be mixed with the coating composition (D) to obtain a transparent and homogeneous solution and does not react with each component of the coating composition (D). Examples thereof include aromatic hydrocarbons such as toluene and xylene; aliphatic hydrocarbons such as hexane, heptane, octane, decane and cyclohexane, and esters such as ethylacetate, butylacetate and 2-hydroxyethylacetate; aliphatic alcohols such as ethylalcohol, n-propylalcohol and isopropylalcohol, ethyleneglycol, propyleneglycol, diethyleneglycolmonomethylether, triethyleneglycolmonomethylether and propyleneglycol monomethyletheracetate; ketones such as acetone, methylethylketone and methylisobutylketone; amide solvents such as N,N-dimethylformamide, N,N-dimethylacetamide, N-methylpyrrolidone, 3-methoxy-N,N-dimethylpropanamide, 3-butoxy-N,N-dimethylpropanamide, acetonitrile. One of these solvents may be used alone, or two or more thereof may be used in combination. From the viewpoint of carrying out polymerization and curing after applying the coating composition (D) to a base material and removing solvents, it is preferable to use ethyl acetates, methyl ethyl ketone, acetone and the like which have low boiling points and are easy to remove.

The coating composition (D) may contain various additives as necessary. Specific examples of the additives include thermal polymerization inhibitors, antioxidants, ultraviolet sensitizers, antiseptics, phosphate and other flame retardants, surfactants, antistatic agents, colorants such as pigments and dyes, perfumes, antifoaming agents, fillers, silane coupling agents, surface tension-adjusting agents, plasticizers, surface lubricants, leveling agents, softeners, organic fillers, inorganic fillers, and silica particles. The amount of these other components to be added is not particularly limited as long as it does not adversely affect the properties of the coating composition (D) and is preferably in the range of 5% by mass or less with respect to the entire coating composition (D).

A third embodiment of the present invention is a molded article such as a laminate, a surface protective sheet such as a cover film, and a substrate provided with a coating layer obtained by applying the coating composition (D) to various base materials and curing the coating composition (D) by various polymerization methods. The film used as the base material may be anyone selected from polyester film, polycarbonate film, fluorine-containing resin film, polyimide film, triacetylcellulose film, acrylic film, polystyrene film, polyvinyl chloride film, polyvinyl alcohol film, nylon film. The transparent base material film is a transparent film which has a total light transmittance of 80% or more and can be selected from transparent polyester film, transparent polycarbonate film, transparent fluorine-containing resin film, transparent polyimide film, transparent triacetylcellulose film, transparent acrylic film, transparent polystyrene film, transparent polyvinyl chloride film, transparent polyvinyl alcohol film, transparent nylon film. The coating composition (D) is applied to one surface or both surfaces of various substrate films, and polymerization and/or curing are performed by various polymerization methods to obtain a laminate or the like having a coating layer on one surface or both surfaces of a base material. The coating composition (D) can be applied by a conventionally known method, for example, an ordinary coating film forming method such as a spin coating method, a spray coating method, a knife coating method, a dipping method, a gravure roll method, a reverse roll method, a screen-printing method, or a bar coater method.

Hereinafter, the present invention will be described more specifically with reference to Examples and Comparative Examples, but the present invention is not limited to these Examples. In the following, "parts" and "%" are all on a mass basis unless otherwise specified.

Abbreviations of acrylic polymer (A), polymerizable compound (B), initiator (C) and various base materials (E) described in Examples and Comparative Examples are as follows.

<Acrylic Polymer (A)>

A-1: a homopolymer of 2-ethylhexylacrylate (b1-3), weight-average molecular weight (Mw)=5,600,000, Tg=–85° C.

A-2: a copolymer of 2-ethylhexylacrylate (b1-3), butylacrylate (b1-4) and N,N-dimethylacrylamide (b1-8) (molar ratio=70/10/20), Mw-2,200,000, Tg=–69° C.

A-3: a copolymer of butylacrylate (b1-4) and N-isopropylacrylamide (b1-14) (molar ratio=70/30), Mw-600,000, Tg=–22° C.

A-4: a copolymer of ethylacrylate (Tg=–20° C.), isobutylmethacrylate (b1-1) and diacetone acrylamide (b1-13) (molar ratio=30/50/20), Mw=120,000, Tg=35° C.

A-5: a copolymer of 2-ethylhexylacrylate (b1-3) and oleylacrylamide (b1-16) (molar ratio-80/20), Mw=900,000, Tg=–60° C.

A-6: a copolymer of 2-ethylhexylacrylate (b1-3) and allylmethacrylate (Tg–52° C.) (molar ratio=90/10), Mw=850,000, Tg=–79° C.

A1-1: a copolymer of 2-ethylhexylacrylate (b1-3), N,N-diethylacrylamide (b1-9) and N-(2-hydroxyethyl) acrylamide (b1-10) (molar ratio=60/35/5), Mw=1,100,000, Tg=–52° C.

A1-2: a copolymer of isobutylacrylate (Tg–26° C.) and acrylicacid (b1-17) (molar ratio=95/5), Mw=2,800,000, Tg=–24° C.

A2-1: a copolymer of isodecylacrylate (b1-5), isobornylacrylate (b1-11) and glycidylmethacrylate (b1-19) (molar ratio=70/28/2), Mw=330,000, Tg=–29° C.

A2-2: a copolymer of 2-ethylhexyl acrylate (b1-3), acryloyl morpholin (b1-12) and 2-isocyanatoethylmethacrylate (b1-18) (molar ratio=80/17/3), Mw=730,000, Tg=–67° C.

A3-1: a copolymer modified by glycidylmethacrylate (molar ratio=20) after copolymerized isodecylacrylate (b1-5), acryloylmorpholine (b1-12) and acrylicacid (b1-17) (molar ratio=50/10/20), Mw=180,000, Tg=22° C.

A3-2: a copolymer of 2-ethylhexyl acrylate (b1-3), oleyl acrylamide (b1-16), isobornylacrylate (b1-11) and N-acryloyloxyethylnorbornenecarboxamide (registered trademark is "Kohshylmer", manufactured by KJ Chemicals Co., Ltd) (molar ratio=25/25/40/10), Mw=240,000, Tg–8° C.

<Polymerizable Compound (B)> b1-1: methacrylate isobutylmethacrylate (Tg=48° C.)

b1-2: cyclohexylacrylate (Tg=15° C.)

b1-3:2-ethylhexylacrylate (Tg=–85° C.)

b1-4: Butylacrylate (Tg=–54° C.)

b1-5: Isodecylacrylate (Tg=–62° C.)

b1-6: phenoxyethylacrylate (Tg=–22° C.)

b1-7: dicyclopentenyloxyethylacrylate (Tg=10° C.)

b1-8: N,N-dimethylacrylamide (Tg=119° C.) (registered trademarks "Kohshylmer" and "DMAA", manufactured by KJ Chemicals Co., Ltd)

b1-9: N,N-diethylacrylamide (Tg=81° C.) (registered trademarks "Kohshylmer" and "DEAA", manufactured by KJ Chemicals Co., Ltd)

b1-10: N-(2-hydroxyethyl) acrylamide (Tg=98° C.) (registered trademarks "Kohshylmer" and "HEAA", manufactured by KJ Chemicals Co., Ltd)

b1-11: isobornylacrylate (Tg=94° C.)

b1-12: acryloylmorpholine (Tg=145° C.) (registered trademarks "Kohshylmer" and "ACMO", manufactured by KJ Chemicals Co., Ltd)

b1-13: diacetoneacrylamide (Tg–77° C.) (trade name "Kohshylmer", manufactured by KJ Chemicals Co., Ltd)

b1-14: N-isopropylacrylamide (Tg=134° C.) (registered trademarks "Kohshylmer" and "NIPAM", manufactured by KJ Chemicals Co., Ltd)

b1-15:4-tert-butylcyclohexylacrylate (Tg–77° C.) (trade name "Kohshylmer", manufactured by KJ Chemicals Co., Ltd)

b1-16: oleylacrylamide (Tg=29° C.) (trade name "Kohshylmer", manufactured by KJ Chemicals Co., Ltd)

b1-17: acrylicacid (Tg=106° C.)

b1-18:2-isocyanatoethylmethacrylate (Tg–60° C.) (Karenz MOI, manufactured by Showa Denko Co., Ltd)

b1-19: glycidylmethacrylate (Tg=46° C.)

b2-1: pentaerithritol (tri/tetra) acrylate (3 or 4-functional)

b2-2: dipentaerythritolhexaacrylate (6-functional)

b2-3: bisphenol-A-ethyleneglycol (4) adducted diacrylate (2-functional, Light Acrylate BP-4EAL, Kyoeisha Chemical Co., Ltd)

b2-4: tripropyleneglycoldiacrylate (2-functional)

b3-1: a polyester-based urethaneacrylate (2-functional, SHIKOU UV-3000B, Mw=18,000, manufactured by Mitsubishi Chemical Co., Ltd)

b3-2: a polyether-based urethaneacrylate (2-functional, SHIKOU UV-6640B, Mw=5,000, manufactured by Mitsubishi Chemical Co., Ltd).

b3-3: a polycarbonate-based urethaneacrylamide (trademark "Quick Cure", 2-functional, Mw=15,000, manufactured by KJ Chemicals Co., Ltd).

b3 4: a polyester-based urethaneacrylamide (trademark "Quick Cure", 3-functional, Mw=9,000, manufactured by KJ Chemicals Co., Ltd)

b3-5: a polyether-based urethaneacrylamide (trademark "Quick Cure", 2-functional, Mw=35,000, manufactured by KJ Chemicals Co., Ltd)

<Initiator (C)>

C-1:1-hydroxycyclohexylphenylketone (photopolymerization initiator, Omnirad 184, IGM ResinsB.V)

C-2:2-hydroxy-2-methyl-1-phenyl-propan-1-one (photopolymerization initiator, Omnirad 1173, IGM ResinsB.V).

C-3:2,4,6-trimethylbenzoyl-diphenyl-phosphineoxide (photopolymerization initiator, Omnirad TPO, IGM ResinsB.V)

C-4:2,2'-azobis(2,4-dimethylvaleronitrile) (thermal polymerization initiator, V-65, Wako Pure Chemical Industries, Ltd)

<Film-Like Base Material>

E-1: polyethyleneterephthalate (PET) film (Cosmoshine A4300, one side anchor coated, manufactured by Toyobo Co., Ltd)

E-2: polycarbonate film (Panlite PC-2151, manufactured by Teijin Co., Ltd)

E-3: polyimide film (Kapton, manufactured by DuPont-Toray Co., Ltd)

E-4: transparent polyimide film (manufactured by TOR-MEND™, I.S.T Co., Ltd)

e-5: transparent acrylic film (Sanduren SD-014, manufactured by Kaneka Co., Ltd)

Examples 1 to 24 and Comparative Examples 1 to 8

Coating compositions (D-1) to (D-24) of Examples 1 to 24 and mixed solutions (F-1) to (F-8) of Comparative Examples 1 to 8 were prepared by adding predetermined parts by mass shown in Tables 1 to 3 of acrylic polymer (A), polymerizable compound (B), initiator (C) and the like to a vessel and uniformly mixing them. Then, using the obtained coating compositions of Examples and the mixed solutions of Comparative Examples, non-adhesive coating layers and an adhesive coating layers (adhesive layers) as cured films by heating and/or ultraviolet (UV) irradiation, and film laminates provided with these coating layers were prepared and evaluated by the following methods. The polymer used in Comparative Example 3 was a butylacrylate (b1-4) homopolymer (P-1, Mw=100,000, Tg=−54° C.), and the polymer used in Comparative Example 7 was butylacrylate (b1-4) and acrylic acid (b1-17)'s copolymer (P-2), molar ratio=90/10, Mw=150,000, Tg=−44° C.).

TABLE 1

| Coating compositions (% by mass) | | Examples | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| | | For non-adhesive coating layer | | | | | | | | | | | | | | | |
| | | D-1 | D-2 | D-3 | D-4 | D-5 | D-6 | D-7 | D-8 | D-9 | D-10 | D-11 | D-12 | D-13 | D-14 | D-15 | D-16 |
| Acrylic polymer (A) | A-1 | 0.5 | | | | | | | | | | | | 1 | | | |
| | A-2 | | 5 | | | | | | | | | | | | | | 5 |
| | A-3 | | | 10 | | | | | | 2 | | | | | 1 | | |
| | A-4 | | | | 20 | | | | | | | | 2 | 11 | | | |
| | — | | | | | 15 | | | | | | | | | | | |
| | A-6 | | | | | | 25 | | | | | | | | | | 4.5 |
| | A1-1 | | | | | | | 6 | | | | | | | | | |
| | A1-2 | | | | | | | | 16 | | | | | | | | |
| | A2-1 | | | | | | | | | 8 | | | | | | 2 | |
| | A2-2 | | | | | | | | | | 12 | | | | | | |
| | A3-1 | | | | | | | | | | | 15 | | | | | |
| | A3-2 | | | | | | | | | | | | 3 | | | | |
| Polymerizable compound (B) | b1-1 | 50 | | | | | | | | | 8 | | | | | | |
| | b1-2 | | 30 | | | | | | | | | | | | | | |
| | b1-3 | | | 17 | | | | | 13 | | | | | | | | |
| | b1-4 | | | | 5 | | | | | | | | | | | 12 | |
| | b1-5 | | | | | 20 | | | | | | | | | | | |
| | b1-7 | | | | | | | | | 40 | | | 10 | | | | |
| | b1-8 | | 42 | | | | | | | 35 | | 3 | | | 50 | | |
| | b1-9 | | | | | | 45 | 33 | | | | | | | | | 80 |
| | b1-10 | | | | 5 | | | | | | 10 | | | | | | |
| | b1-11 | | | 17 | | | | | | | 30 | | | | | | |
| | b1-12 | | | | | | | | 45 | | | 30 | | 20 | | | |
| | b1-13 | 44.5 | | | | | | | | | | | | | 10 | | |
| | b1-14 | | | | | 60 | | | | | | | 40 | | | | |
| | b1-15 | | | | | | | 30 | | | | | | | | | |
| | b1-17 | | | | | | | | | 5 | | | | | | 3 | |
| | b1-18 | | | | | | | 1 | | | | | | | | | |
| | b1-19 | | | | | | | | 2 | | | | | | | | |
| | b2-1 | 2 | | | | 20 | | | | | | | | 30 | | | 10 |
| | b2-2 | | | 35 | | | | 10 | | | | | | | | | |
| | b2-3 | | | | | | | | | 5 | | 45 | | | | 80 | |
| | b2-4 | | | | 60 | | | | | | 5 | | 10 | | 15 | | |
| | b3-1 | 2 | | | | | 5 | | | | | | | 15 | | | |
| | b3-2 | | | | | | | 10 | | | | | | | | | |
| | b3-3 | | 20 | | | | | | 22 | | | 5 | | | | | 2 |
| | b3-4 | | | 18 | | | | | | | 30 | | | 20 | | | |
| | b3-5 | | | | | 8 | | | | 2 | | | 28 | | 20 | | |

TABLE 1-continued

| Coating compositions | | Examples | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| | | For non-adhesive coating layer | | | | | | | | | | | | | | | |
| (% by mass) | | D-1 | D-2 | D-3 | D-4 | D-5 | D-6 | D-7 | D-8 | D-9 | D-10 | D-11 | D-12 | D-13 | D-14 | D-15 | D-16 |
| Polymerization Initiator (C) | C-1 | | | 3 | | 2 | | | | 3 | 5 | | 5 | 3 | | | 0.5 |
| | C-2 | | | | 3 | | | 10 | 2 | | | 2 | 2 | | | 1 | |
| | C-3 | | | | | 5 | 5 | | | | | | | | 4 | | |
| | C-4 | 1 | | | | | | | | | | | | | | | |

TABLE 2

| Coating compositions | | Examples | | | | | | | |
|---|---|---|---|---|---|---|---|---|---|
| | | 17 | 18 | 19 | 20 | 21 | 22 | 23 | 24 |
| | | For adhesive coating layer | | | | | | | |
| (% by mass) | | D-17 | D-18 | D-19 | D-20 | D-21 | D-22 | D-23 | D-24 |
| Acrylic polymer (A) | A-1 | 30 | | | | | | | |
| | A-4 | | 1 | | | | | | |
| | A-6 | | | 2 | | | | | |
| | A1-1 | | | | 25 | | 10 | | |
| | A1-2 | | | | | 15 | | | |
| | A2-1 | | | | | | 10 | | |
| | A2-2 | | | | | | | | 20 |
| | A3-1 | | | | | | | 10 | |
| Polymerizable compound (B) | b1-3 | | | 25 | | | 35 | | 30 |
| | b1-4 | 27 | | | | 50 | | | |
| | b1-5 | | 50 | | | | | 60 | |
| | b1-6 | | | | 29.5 | | | | |
| | b1-8 | | | 20 | | | | | |
| | b1-9 | | | | | | 30 | | |
| | b1-10 | 5 | | | | | | | 10 |
| | b1-11 | | | | | | | | 10 |
| | b1-12 | | | | | | | 20 | |
| | b1-14 | | | | | 3 | | | |
| | b1-15 | | 20 | | | | | | |
| | b1-16 | 15 | | | | | | | |
| | b1-17 | | | | | | 5 | | |
| | b1-18 | | | | 0.5 | | | | |
| | b1-19 | | | | | 1 | | | |
| | b2-1 | | | | | | | | 0.5 |
| | b2-3 | | | | | 20 | 5 | | |
| | b2-4 | | | 2 | | | | 1 | |
| | b3-1 | | | 50 | | | | 5 | |
| | b3-2 | | | | 12 | | | | |
| | b3-3 | 20 | | | | | | | |
| | b3-4 | | 3 | | | | | | |
| | b3-5 | | 25 | | 30 | 10 | | | 25 |
| Polymerization Initiator (C) | C-1 | | | 1 | | | 5 | | 4.5 |
| | C-2 | 3 | 1 | | 3 | 1 | | | |
| | C-3 | | | | | | | 4 | |

TABLE 3

| Mixed solutions | | Comparative Examples | | | | | | | |
|---|---|---|---|---|---|---|---|---|---|
| | | 1 | 2 | 3 | 4 | 5 | 6 | 7 | 8 |
| | | For non-adhesive coating layer | | | | For adhesive coating layer | | | |
| (% by mass) | | F-1 | F-2 | F-3 | F-4 | F-5 | F-6 | F-7 | F-8 |
| Acrylic polymer (A) or Polymer (P) | A-1 | | | | | 35 | 0.2 | | |
| | A-2 | 35 | 0.1 | | | | | | |
| | P-1 | | | 10 | | | | | |
| | P-2 | | | | | | | 10 | |
| Polymerizable compound (B) | b1-1 | 35 | | | | | | | |
| | b1-2 | | | 17 | | | | | |

TABLE 3-continued

| Mixed solutions | | Comparative Examples | | | | | | | |
| | | 1 | 2 | 3 | 4 | 5 | 6 | 7 | 8 |
| | | For non-adhesive coating layer | | | | For adhesive coating layer | | | |
| (% by mass) | | F-1 | F-2 | F-3 | F-4 | F-5 | F-6 | F-7 | F-8 |
| | b1-4 | | | | | 27 | | 25 | |
| | b1-6 | | | | | | 50 | | 50 |
| | b1-6 | | | | 36 | | | | |
| | b1-8 | | 50 | | | | | | |
| | b1-11 | | 20 | | | | | | |
| | b1-12 | | | | | | | 5 | |
| | b1-13 | 25 | 14.9 | | | | | | |
| | b1-14 | | | | | | | | 20 |
| | b1-16 | | | | | | 20.8 | | |
| | b1-18 | | | | | 15 | | | |
| | b2-2 | | | 35 | 30 | | | | |
| | b2-3 | 2 | | | | | | | 0 |
| | b2-4 | | 15 | | | | | 40 | |
| | b3-1 | | | | 20 | | | | |
| | b3-2 | | | | | | | | 17 |
| | b3-3 | 2 | | | 6 | 20 | | | |
| | b3-4 | | | 15 | | | 3 | | |
| | b3-5 | | 15 | | | | 25 | 18 | |
| Initiator | C-1 | | | | | | | 2 | |
| (C) | C-2 | | | 3 | 8 | 3 | 1 | | |
| | C-3 | | 5 | | | | | | 3 |
| | C-4 | 1 | | | | | | | |

<Preparation and Evaluation of Non-Adhesive Coating Layer>

In Examples 25 to 40, the prepared coating compositions (D-1) to (D-16) and in Comparative Examples 9 to 12, the prepared mixed solutions (F-1) to (F-4) were applied to an anchor coat surface of a 100 μm thick polyethylene terephthalate (PET) film (Cosmoshine A4100, manufactured by Toyobo Co., Ltd., one side anchor coat treatment) to a film thickness of 10 μm with a bar coater (No. 6 manufactured by RDS Co., Ltd.) by using a desktop coater (Coater TC-1, manufactured by Mitsui Electric Seiki Co., Ltd) to obtain uncured coating films. In Example 25 and Comparative Example 9, the uncured coating films were aged in a thermostatic bath at 80° C. for 5 hours to obtain coating layers as cured films. In Examples 26 to 40 and Comparative Examples 10 to 12, the uncured coating films were irradiated with ultraviolet rays (illuminance 700 mW/cm², cumulative light quantity 1000 mJ/cm²) (apparatus: inverter-type conveyor apparatus ECS-4011GX manufactured by Eye Graphics Co., Ltd., metal halide lamp: M04-L41 manufactured by Eye Graphics Co., Ltd.) to obtain coating layers as cured films. In Examples 31 to 34 and 39, using the coating compositions (D-7) to (D-10) and (D-15), the uncured coating films were prepared and irradiated with ultraviolet rays and then were aged in a thermostatic bath at 40° C. for 3 days. These coating compositions contain acrylic polymer (A1) having the active hydrogen-containing functional groups (R1) in the side chains and contain acrylic polymer (A2) having functional groups (R2) which can react with the active hydrogen-containing functional groups (R1) in the side chains. The curability of the obtained coating composition and the surface hardness, tack resistance, scratch resistance, shrinkage resistance and moist heat resistance of the non-adhesive coating layers were measured according to the following methods. The evaluation results are shown in Table 4.

<Curability of Coating Composition (D) and Mixed Solution (F)>

The height of the peaks (1620 to 1640 cm$^{-1}$) derived from the vinyl groups of the coating composition was measured by FT-IR, and the curing rate was calculated as follows to evaluate the curability of the coating composition.

Curing rate (%)=(Peak height derived from vinyl group before curing−Peak height derived from vinyl group after curing)/Peak height derived from vinyl group before curing×100%

◎: curing rate of 90% or more
○: curing rate of 80% or more and less than 90%
x: curing rate less than 80%

<Shrinkage Resistance of Non-Adhesive Coating Layer>

A cured non-adhesive coating layer was prepared in the same manner as described above except that the non-adhesive coating layer was 50 μm thick, the obtained cured coating layer was cut into 10×10 cm² portions, and the heights of lifting at four corners were measured. An average value was calculated from the measured values of five sheets cut in the same manner.

◎: The lift height was less than 0.5 mm.
○: The lifting height was greater than or equal to 0.5 mm and less than 1 mm.
x: The floating height was greater than or equal to the 1 mm.

<Tack Resistance of Non-Adhesive Coating Layer>

A cured non-adhesive coating layer having a thickness of 10 μm was prepared in the same manner as described above. The surface of the coating layer was touched with a finger, and the tack resistance of the non-adhesive coating layer was evaluated based on the degree of stickiness.

◎: There was no stickiness.
○: There was slight stickiness, but no finger marks remain on the surface.
Δ: It was tacky and leaves finger marks on the surface.
x: stickiness was severe and fingers stick to surfaces.

<Scratch Resistance of Non-Adhesive Coating Layer>

A cured non-adhesive coating layer having a thickness of 10 μm was prepared in the same manner as described above. The surface of the coating layer was reciprocated by a No.

0000 steel wool for 10 times while applying a 100 g/cm$^2$ load, and the presence or absence of scratches was visually evaluated.

⊚: Almost no peeling or scratching of the film was observed.

○: Slight fine scratches were observed in a part of the membrane.

Δ: Streaky scratches were observed on the entire surface of the film.

x: Peeling of the film occurred.

<Surface Hardness of Non-Adhesive Coating Layer>

A cured non-adhesive coating layer having a thickness of 10 μm was prepared in the same manner as described above. According to JIS K 5600-5-4, the pencil hardness was defined as the hardest pencil that did not scratch the surface of the non-adhesive coating layer when the pencil was scratched at an angle of 45° by about 10 mm.

⊚: pencil hardness is 3H or more.

○: pencil hardness was H to 2H.

Δ: pencil hardness was B to F.

x: pencil hardness was 2B or less.

<Moist Heat Resistance of Non-Adhesive Coating Layer>

A cured non-adhesive coating layer having a thickness of 10 μm was prepared in the same manner as described above. The sample was kept under conditions of a temperature of 85° C. and a relative humidity of 85% for 100 hours, and the presence or absence of generation of bubbles or fogging was visually observed and evaluated as follows.

⊚: It was transparent and did not generate bubbles.

○: There was very little cloudiness, but no bubbles.

x: Fogging or bubbling occurred.

<Preparation and Evaluation of Film Laminate Having Non-Adhesive Coating Layer>

Using a polyethylene terephthalate (PET) film (E-1), a polycarbonate (PC) film (E-2), a polyimide (PI) film (E-3), a transparent polyimide film (E-4), and an acrylic film (E-5) as base materials, a non-adhesive coating layer having a thickness of 10 μm was prepared on one surface of each film by the same method as described above. The obtained base film provided with the non-adhesive coating layer was used as various film laminates, and the adhesion between the coating layer and the base film and the bending resistance and transparency of the film laminate were evaluated according to the following methods. The results are shown in Table 4.

<Adhesion of Film Laminate Having Non-Adhesive Coating Layer>

Using the obtained film laminate, a cellophane tape was attached to the surfaces of the coating layers cut into 100 squares (1×1 mm$^2$) in accordance with JIS K 5600-5-6, and then the cellophane tape was peeled off at once, and the number of squares in which the coating layers remained on the base material film was counted, and evaluation was performed as follows. The results are shown in Table 4.

⊚: 100 squares of the coating layer remained.

○: 90 to 99 squares of the coating layer remained.

Δ: 60 to 89 squares of the coating layer remained.

x: less than 60 squares of the coating layer remained.

<Bending Resistance of Film Laminate Having Non-Adhesive Coating Layer>

The obtained film laminate was cut into a test piece having a width of 15 mm and a length of 100 mm, and an MIT type folding fatigue tester (manufactured by Toyo Seiki Seisakusho Co., Ltd., D type) was used in accordance with JIS P8115. With a load of 0.25 kgf applied to the test piece, a bending test was performed 20,000 times under conditions of a bending clamp radius R of 2.0 mm, a bending angle of 135°, and a speed of 175 cpm. After the test, the presence or absence of peeling of the coating layer, cracks, and cloudiness was visually observed and evaluated as follows. The results are shown in Table 4.

⊚: The coating layer was transparent and neither peeling nor cracking occurred.

○: Although there was slight cloudiness at the coating layer, neither peeling nor cracking occurred.

Δ: The coating layer was slight cloudiness, peeling or cracking occurred.

x: The coating layer was cloudiness, peeling, or cracking occurred.

<Transparency of Film Laminate Having Non-Adhesive Coating Layer>

The obtained film laminate was cut into 100 mm$^2$ test pieces and kept in an environment at a temperature of 23° C. and a relative humidity of 50% for 24 hours. Thereafter, the total light transmittance of the non-colored film laminate was measured under the same conditions in accordance with JIS K 7361-1, and evaluation was performed as follows. The results are shown in Table 4. Since the polyimide film (E-3) was yellow, the transparency of the film laminate was not evaluated.

⊚: Transmission was 90% or more.

○: Transmission was 80% or more and less than 90%.

x: transmission was less than 80%.

TABLE 4

| Non-adhesive coating layer | | Examples | | | | | | | | | |
|---|---|---|---|---|---|---|---|---|---|---|---|
| | | 25 | 26 | 27 | 28 | 29 | 30 | 31 | 32 | 33 | 34 |
| (D), (F) | | D-1 | D-2 | D-3 | D-4 | D-5 | D-6 | D-7 | D-8 | D-9 | D-10 |
| Curability (D), (F) | | ○ | ○ | ⊚ | ○ | ○ | ⊚ | ⊚ | ⊚ | ⊚ | ⊚ |
| Properties of non-adhesive coating layer | Shrinkage resistance | ○ | ○ | ○ | ○ | ⊚ | ⊚ | ⊚ | ⊚ | ○ | ⊚ |
| | Tack resistance | ○ | ⊚ | ⊚ | ⊚ | ○ | ⊚ | ⊚ | ⊚ | ○ | ⊚ |
| | Scratch resistance | ○ | ○ | ⊚ | ⊚ | ○ | ⊚ | ○ | ⊚ | ⊚ | ⊚ |
| | Surface hardness | ○ | ○ | ⊚ | ○ | ○ | ○ | ⊚ | ⊚ | ○ | ⊚ |
| | Moist heat resistance | ○ | ⊚ | ⊚ | ○ | ○ | ⊚ | ⊚ | ⊚ | ○ | ⊚ |
| Adhesion | Base material E-1 | ○ | ⊚ | ⊚ | ⊚ | ○ | ⊚ | ⊚ | ⊚ | ⊚ | ⊚ |
| | Base material E-2 | ⊚ | ⊚ | ⊚ | ⊚ | ⊚ | ⊚ | ⊚ | ⊚ | ⊚ | ⊚ |

TABLE 4-continued

| | | | | | | | | | | | |
|---|---|---|---|---|---|---|---|---|---|---|---|
| | Base material E-3 | ○ | ○ | ◎ | ○ | ○ | ◎ | ◎ | ○ | ○ | ◎ |
| | Base material E-4 | ○ | ○ | ○ | ○ | ○ | ○ | Δ | ◎ | ○ | ◎ |
| | Base material E-5 | ○ | ◎ | ◎ | ○ | ○ | ○ | ○ | ○ | ◎ | ◎ |
| Bending resistance | Base material E-1 | ○ | ◎ | ○ | ◎ | ○ | ◎ | ◎ | ◎ | ○ | ◎ |
| | Base material E-2 | ◎ | ◎ | ◎ | ◎ | ◎ | ◎ | ◎ | ◎ | ◎ | ◎ |
| | Base material E-3 | ◎ | ○ | ○ | ○ | ◎ | ◎ | ◎ | ◎ | ◎ | ◎ |
| | Base material E-4 | ○ | ○ | ○ | ○ | ◎ | ○ | Δ | ◎ | ○ | ◎ |
| | Base material E-5 | ○ | ◎ | ◎ | ◎ | ○ | ◎ | ○ | ◎ | ○ | ◎ |
| Transparency | Base material E-1 | ○ | ○ | ◎ | ◎ | ◎ | ◎ | ◎ | ◎ | ○ | ○ |
| | Base material E-2 | ◎ | ◎ | ◎ | ◎ | ○ | ◎ | ◎ | ◎ | ◎ | ◎ |
| | Base material E-4 | ○ | ○ | ○ | ○ | ○ | ○ | ○ | ◎ | ○ | ◎ |
| | Base material E-5 | ◎ | ◎ | ○ | ○ | ○ | ◎ | ◎ | ○ | ◎ | ◎ |

| Non-adhesive | | Examples | | | | | | Comparative Example | | | |
|---|---|---|---|---|---|---|---|---|---|---|---|
| coating layer | | 35 | 36 | 37 | 38 | 39 | 40 | 9 | 10 | 11 | 12 |
| (D), (F) | | D-11 | D-12 | D-13 | D-14 | D-15 | D-16 | F-1 | F-2 | F-3 | F-4 |
| Curability (D), (F) | | ◎ | ◎ | ◎ | ○ | ◎ | ◎ | ○ | ○ | ○ | ○ |
| Properties of non-adhesive coating layer | Shrinkage resistance | ◎ | ◎ | ◎ | ○ | ◎ | ○ | ○ | X | X | ◎ |
| | Tack resistance | ◎ | ◎ | ◎ | ○ | ◎ | ○ | Δ | ○ | ○ | Δ |
| | Scratch resistance | ◎ | ◎ | ◎ | ◎ | ◎ | ◎ | X | ◎ | ◎ | ◎ |
| | Surface hardness | ◎ | ○ | ◎ | ◎ | ◎ | ◎ | Δ | ○ | ○ | Δ |
| | Moist heat resistance | ○ | ◎ | ◎ | ◎ | ○ | ○ | X | ◎ | ◎ | ○ |
| Adhesion | Base material E-1 | ○ | ◎ | ◎ | ◎ | ○ | ○ | ○ | ○ | Δ | ○ |
| | Base material E-2 | ◎ | ◎ | ◎ | ◎ | ◎ | ◎ | ○ | ◎ | Δ | ○ |
| | Base material E-3 | ○ | ◎ | ◎ | ◎ | ○ | ◎ | ○ | X | X | X |
| | Base material E-4 | ○ | ○ | ○ | ○ | Δ | ○ | ○ | X | X | X |
| | Base material E-5 | ◎ | ◎ | ○ | ◎ | ◎ | ○ | ○ | X | Δ | ○ |
| Bending resistance | Base material E-1 | ○ | ◎ | ○ | ◎ | ○ | ◎ | Δ | Δ | Δ | ○ |
| | Base material E-2 | ◎ | ◎ | ◎ | ◎ | ◎ | ◎ | Δ | ○ | Δ | Δ |
| | Base material E-3 | ○ | ◎ | ◎ | ◎ | ○ | ○ | X | X | X | X |
| | Base material E-4 | ○ | ○ | ○ | ○ | Δ | ○ | X | X | X | X |
| | Base material E-5 | ◎ | ◎ | ○ | ◎ | ◎ | ○ | Δ | Δ | Δ | ○ |
| Transparency | Base material E-1 | ◎ | ◎ | ○ | ◎ | ◎ | ◎ | X | ○ | X | ○ |
| | Base material E-2 | ◎ | ◎ | ◎ | ○ | ◎ | ◎ | X | ○ | X | ○ |
| | Base material E-4 | ○ | ○ | ◎ | ○ | ◎ | ○ | X | X | X | X |
| | Base material E-5 | ◎ | ◎ | ◎ | ◎ | ◎ | ◎ | X | X | X | X |

Preparation and Evaluation of Adhesive Coating Layer

Examples 41-48 and Comparative Examples 13-16

In Examples 41 to 48, the prepared coating compositions (D-17) to (D-24) and in Comparative Examples 13 to 16, the prepared mixed solutions (F-5) to (F-8) were applied to the anchor coat surface of a 100 μm thick polyethylene terephthalate (PET) film (Cosmoshine A4100, manufactured by Toyobo Co., Ltd., one side anchor coat treatment) so as to have a film thickness of 50 μm with a bar coater (RDS30) using a desktop coater (Coater TC-1, manufactured by Mitsui Electric Seiki Co., Ltd). After that, a 50 μm thick light-release PET film (polyester Film E7002, manufactured by Toyobo Co., Ltd) was overlaid on the coating film and irradiated with ultraviolet rays (apparatus: inverter-type conveyer apparatus ECS-4011GX, manufactured by Eye Graphics Co., Ltd, metal halide lamp: M04-L41 manufactured by Eye Graphics Co., Ltd, ultraviolet rays (illumination 700 mw/cm$^2$, cumulative light quantity 1000 mJ/cm$^2$)). Thereafter, the light-release PET film was removed to obtain an adhesive coating layer as a cured film. In Examples 44 to 46 and 48 using the coating compositions (D-20) to (D-22) and (D-24) which containing acrylic polymer (A1) having active hydrogen-containing functional groups (R1) in the side chains or acrylic polymer (A2) having functional groups (R2) that can react with the active hydrogen-containing functional groups (R1) in the side chains, aging was further performed in a thermostatic bath at 40° C. for 3 days after ultraviolet irradiation, thereafter, the light-release PET film was removed to obtain an adhesive coating layer for evaluation. The curability of the obtained coating composition, and the shrinkage resistance, moist heat resistance and step followability of the adhesive coating layer were measured according to the following methods. The evaluation results are shown in Table 5.

<Curability of Coating Composition (D) and Mixed Solution (F)>

The height of the peaks (1620 to 1640 cm$^{-1}$) derived from the vinyl groups of the coating composition was measured by FT-IR, and the curing rate was calculated as follows to evaluate the curability of the coating composition.

$$\text{Curing rate (\%)} = (\text{Peak height derived from vinyl}$$
$$\text{group before curing} - \text{Peak height derived from}$$
$$\text{vinyl group after curing})/\text{Peak height derived}$$
$$\text{from vinyl group before curing} \times 100\%$$

◎: curing rate of 90% or more
○: curing rate of 80% or more and less than 90%
x: curing rate less than 80%

<Shrinkage Resistance of Adhesive Coating Layer>

A cured adhesive coating layer was prepared in the same manner as described above except that the adhesive coating layer was 100 μm thick, the obtained cured coating layer was cut into 10×10 cm$^2$ portions, and the heights of lifting at four corners were measured. An average value was calculated from the measured values of five sheets cut in the same manner.

◎: The lift height was less than 0.5 mm.
○: The lifting height was greater than or equal to 0.5 mm and less than 1 mm.
x: The floating height was greater than or equal to the 1 mm.

<Moist Heat Resistance of Adhesive Coating Layer>

A cured adhesive coating layer having a thickness of 50 μm was prepared in the same manner as described above and was kept under conditions of a temperature of 85° C. and a relative humidity of 85% for 100 hours, and the presence or absence of generation of bubbles or fogging was visually observed and evaluated as described below.

◎: It was transparent and did not generate bubbles.
○: There was very little cloudiness, but no bubbles.
x: Fogging or bubbling occurred.

<Step Followability of Adhesive Coating Layer>

A black tape having a thickness of 20 μm was bonded to the glass substrate to prepare a substrate with a step. The adhesive coating layer was transferred to the substrate, and then pressure-bonded by one reciprocation (pressure bonding rate: 300 mm/min) with a roller having a 2 kg load in an atmosphere at a temperature of 23° C. and a relative humidity of 50% and kept at a temperature of 80° C. for 24 hours. The results are shown in Table 5.

◎: No bubbles were observed.
○: Slightly small spherical bubbles were observed.
Δ: Large bubbles were observed, and the bubbles might be connected to each other.
x: Large bubbles were connected to each other and spread in a line at a step portion.

<Contamination Resistance of Adhesive Coating Layer>

A cured adhesive coating layer having a thickness of 50 μm was prepared in the same manner as described above, the light-release PET film was peeled off, the adhesive coating layer was transferred to one surface of each of the base material films (E-1) to (E-5), and the films were pressure-bonded by reciprocating a pressure-bonding roller having a weight of 2 kg twice, followed by leaving at 80° C. for 24 hours. Thereafter, the films (E-1) to (E-5) were peeled off, and the state of the adhesive coating layer remaining on the film surface was visually observed, and the contamination resistance was evaluated in four grades as follows. The results are shown in Table 5.

◎: There was no contamination.
○: There was very little contamination.
Δ: There was slight contamination.
x: There was a glue (adhesive) residue.

<Preparation and Evaluation of Film Laminate Having Adhesive Coating Layer>

A cured adhesive coating layer having a thickness of 50 μm was prepared in the same manner as described above, the light-release PET film was peeled off, the adhesive coating layer was transferred to one surface of each of the base material films (E-1) to (E-5), and a pressure-bonding roller having a weight of 2 kg was reciprocated twice to perform pressure-bonding, thereby obtaining various film laminates. The adhesiveness (adhesive force), transparency and yellowing resistance of the adhesive coating layer were evaluated according to the following methods. The results are shown in Table 5.

<Adhesiveness of Adhesive Coating Layer of Film Laminate>

After the film laminates are kept for 30 minutes in an environment of a temperature of 23° C. and a relative humidity of 50%, a 180° peeling tests of the adhesive coating layer and various film base materials are performed at a peeling rate of 5 mm/sec in conformity with JIS Z 0237:2009, the peel strength was measured and evaluated as follows. The results are shown in Table 5.

◎: 8 N/cm or more
○: 4 N/cm or more and less than 8 N/cm
Δ: 2 N/cm or more and less than 4 N/cm
x: less than 2 N/cm <Transparency of Film Laminate Having Adhesive Coating Layer>

The obtained film laminates were cut into 100 mm$^2$ test pieces and kept in an environment at a temperature of 23° C. and a relative humidity of 50% for 24 hours. Thereafter, the total light transmittance of the non-colored film laminates was measured under the same conditions in accordance with JIS K 7361-1, and evaluation was performed as follows. The results are shown in Table 5. Since the film E-3 was yellow, the transparency of the film laminate was not evaluated.

◎: Transmission was 90% or more.
○: Transmission was 80% or more and less than 90%.
x: Transmission was less than 80%.

<Yellowing Resistance of Film Laminate Having Adhesive Coating Layer>

The obtained non-colored film laminates were analyzed using a Xenon Fadeometer (SC-700-WA: (manufactured by Suga Test Instruments Co., Ltd) and irradiated with ultraviolet rays having an intensity of 70 mW/cm² for 120 hours, and then the non-colored film laminates were visually evaluated in four grades as follows. The results are shown in Table 5. Since the film E-3 was yellow, the evaluation of the yellowing resistance of the film laminate was not carried out.

◎: No yellowing could be observed visually.
○: Slight yellowing could be seen visually.
Δ: Yellowing could be visually observed.
x: A clear yellowing could be seen visually.

the present invention formed from the coating composition exhibits high surface hardness, tack resistance, scratch resistance, shrinkage resistance and moist heat resistance. The non-adhesive coating layers have excellent adhesion to various resinous base materials ranging from general-purpose polyester films and polycarbonate films to polyimide films having poor adhesion. The obtained film laminates which are one of the third embodiment of the present invention provided with the non-adhesive coating layers and various resinous substrates have bending resistance and transparency. Moreover, the adhesive coating layers formed from the coating compositions, which are another embodiment of the second embodiment of the present invention, exhibit high shrinkage resistance and moist heat resistance.

TABLE 5

| Adhesive coating layer | | Examples | | | | | | | | Comparative Examples | | | |
|---|---|---|---|---|---|---|---|---|---|---|---|---|---|
| | | 41 | 42 | 43 | 44 | 45 | 46 | 47 | 48 | 13 | 14 | 15 | 16 |
| (D), (F) | | D-17 | D-18 | D-19 | 0-20 | D-21 | D-22 | D-23 | D-24 | F-5 | F-6 | F-7 | F-8 |
| Curability (D), (F) | | ○ | ◎ | ◎ | ◎ | ◎ | ◎ | ◎ | ◎ | ○ | ◎ | ○ | X |
| Properties of adhesive | Shrinkage resistance | ◎ | ◎ | ◎ | ◎ | ◎ | ◎ | ◎ | ◎ | ◎ | ◎ | X | ◎ |
| | Moist heat resistance | ◎ | ○ | ○ | ○ | ○ | ◎ | ○ | ◎ | ○ | ○ | ○ | X |
| | Step followability | ◎ | ◎ | ◎ | ◎ | ○ | ○ | ○ | ◎ | ◎ | Δ | X | Δ |
| Contamination resistance | Base material E-1 | ◎ | ○ | ◎ | ◎ | ◎ | ○ | ◎ | ◎ | Δ | Δ | X | X |
| | Base material E-2 | ◎ | ◎ | ◎ | ◎ | ◎ | ◎ | ◎ | ◎ | Δ | X | X | Δ |
| | Base material E-3 | ◎ | ○ | ○ | ○ | ◎ | ○ | ○ | ◎ | Δ | X | X | X |
| | Base material E-4 | ○ | ○ | ◎ | ○ | ◎ | ○ | ○ | ○ | X | X | X | X |
| | Base material E-5 | ○ | ○ | ○ | ◎ | ○ | ◎ | ○ | ◎ | X | Δ | Δ | X |
| Adhesiveness | Base material E-1 | ◎ | ◎ | ◎ | ◎ | ◎ | ○ | ◎ | ◎ | ○ | ○ | X | Δ |
| | Base material E-2 | ◎ | ◎ | ◎ | ◎ | ◎ | ◎ | ◎ | ◎ | ○ | ○ | X | ○ |
| | Base material E-3 | ◎ | ○ | ○ | ○ | ◎ | ◎ | ○ | ◎ | ○ | Δ | X | Δ |
| | Base material E-4 | ○ | ○ | ◎ | ○ | ◎ | ○ | ○ | ◎ | X | X | X | X |
| | Base material E-5 | ○ | ○ | ○ | ◎ | ○ | ◎ | ◎ | ◎ | Δ | Δ | Δ | ○ |
| Transparency | Base material E-1 | ◎ | ◎ | ◎ | ◎ | ◎ | ○ | ◎ | ◎ | ○ | ○ | X | X |
| | Base material E-2 | ◎ | ◎ | ◎ | ◎ | ◎ | ◎ | ◎ | ◎ | ○ | ○ | X | X |
| | Base material E-4 | ○ | ○ | ◎ | ○ | ◎ | ○ | ○ | ◎ | X | X | X | X |
| | Base material E-5 | ○ | ○ | ○ | ◎ | ○ | ◎ | ◎ | ◎ | X | X | X | X |
| Yellowing resistance | Base material E-1 | ◎ | ◎ | ◎ | ○ | ◎ | ○ | ◎ | ◎ | Δ | Δ | X | Δ |
| | Base material E-2 | ◎ | ◎ | ○ | ◎ | ◎ | ◎ | ◎ | ○ | X | Δ | X | ○ |
| | Base material E-4 | ◎ | ◎ | ◎ | ○ | ◎ | ○ | ○ | ◎ | X | X | X | Δ |
| | Base material E-5 | ○ | ◎ | ○ | ○ | ◎ | ◎ | ◎ | ○ | X | Δ | Δ | ○ |

As shown in the results of Examples and Comparative Examples, the coating composition according to the first embodiment of the present invention is characterized by high polymerizability and curability by active energy rays such as heat and/or light and good wettability and adhesion to various base materials by containing one or more specific acrylic polymers (A) and one or more polymerizable compound (B) in a specific weight ratio. The non-adhesive coating layers which are one of the second embodiment of the present invention formed from the coating composition The adhesive coating layers have excellent close adhesion and adhesiveness to various resinous base materials ranging from general-purpose polyester films and polycarbonate films to polyimide films having poor adhesion, and in various laminates including the adhesive coating layers, which are another embodiment of the third embodiment of the present invention, haver transparency, contamination resistance and yellowing resistance. The film laminates, cover films and substrates having such a non-adhesive coating layer can achieve both surface hardness and bending resistance. On the other hand, the film laminates having adhesive coating layers are excellent in close adhesion and adhesiveness to a polyimide film or the like having poor adhesion, and further have characteristics such as shrinkage resistance, moist heat resistance and step followability, and can be suitably used in applications to various optical and electronic devices.

INDUSTRIAL APPLICABILITY

As described above, the coating composition of the present invention contains 0.5 to 30.0% by mass of the acrylic polymer (A) having a branched alkyl groups having 3 to 20 carbon atoms and/or branched or unbranched alkenyl groups having 3 to 20 carbon atoms in the side chains, and 70.0 to 99.5% by mass of the polymerizable compound (B). The coating composition is easy to be polymerized and cured by active energy rays such as heat and/or light to obtain a desired non-adhesive or adhesive coating layer. By providing the coating layer on one surface or both surfaces of a resinous base material such as a film, a sheet, or a substrate, a desired laminate, a cover film, or a substrate can be obtained. The coating composition of the present invention can provide anon-adhesive coating layer having good surface hardness, tack resistance, scratch resistance, shrinkage resistance, bending resistance, transparency and moist heat resistance while having excellent wettability and adhesion to a resinous base material, and an adhesive coating layer having good shrinkage resistance, moist heat resistance, step followability, contamination resistance, transparency and yellowing resistance. These optical films can be suitably used as members for various displays and touch panels, materials for electronic devices such as liquid crystal display devices and organic electroluminescence display devices, various sensor materials, and the like, because the non-adhesive coating layer can be used on one side and/or both sides of the above-mentioned various resinous base materials.

The invention claimed is:

1. A coating composition comprising 0.5 to 30.0% by mass of an acrylic polymer (A) and 70.0 to 99.5% by mass of a polymerizable compound (B), wherein the acrylic polymer (A) has 50% by mol or more of structural units derived from one or more (meth)acrylate monomers having branched alkyl groups having 3 to 20 carbon atoms and/or branched or unbranched alkenyl groups having 3 to 20 carbon atoms, and the polymerizable compound (B) comprises a monofunctional acrylic monomer (b1) and a urethane oligomer (b3);

wherein the monofunctional acrylic monomer b1 contains:

a monofunctional acrylic monomer having a homopolymer glass transition temperature (Tg) of 10° C. or less, and a monofunctional acrylic monomer having a homopolymer glass transition temperature (Tg) exceeds 60° C.; and wherein the content of (b3) is 2.0 to 50.0% by mass based on the total coating composition.

2. The coating composition according to claim 1, wherein the acrylic polymer (A) has a weight-average molecular weight of 100,000 to 6,000,000 and a glass transition temperature (Tg) of −85° C. to 40° C.

3. The coating composition according to claim 1, wherein the acrylic polymer (A) has a side chain (A1), or a side chain (A2), and/or a side chain (A3), the side chain (A1) having an active hydrogen-containing functional group (R1), the side chain (A2) having a functional group (R2) which can react with the functional group (R1) in the side chain (A1), and the side chain (A3) having a (meth)acryloyl or unsaturated cycloaliphatic hydrocarbon group.

4. The coating composition according to claim 1, wherein the polymerizable compound (B) contains the monofunctional acrylic monomer (b1) and further comprises a polyfunctional acrylic monomer (b2), and the content of (b1) is 10.0 to 96.0% by mass based on the total coating composition, and the content of (b2) is up to 80.0% by mass based on the total coating composition.

5. The coating composition according to claim 1, wherein the urethane oligomer (b3) is a urethane (meth)acrylamide oligomer.

6. A coating layer obtained by polymerizing the coating composition according to claim 1 with light and/or heat, wherein the coating layer is a non-adhesive coating layer or an adhesive coating layer.

7. An adhesive sheet comprising a film and/or sheet base material and the coating layer according to claim 6 provided on one side or both sides of the base material.

8. A laminate comprising a film and/or sheet base material and the coating layer according to claim 7 provided on one side or both sides of the base material.

9. An optical laminate comprising a film and/or sheet base material and a coating layer provided on one side or both sides of the base material, wherein the coating layer is obtained by polymerizing the coating composition according to claim 1 with light and/or heat, and the optical laminate has a total light transmittance of 80% or more.

10. A laminate for flexible devices, comprising a film and/or sheet base material and a coating layer provided on one side or both sides of the base material, wherein the coating layer is obtained by polymerizing the coating composition according to claim 1 with light and/or heat.

11. A laminate for surface protection comprising a film and/or sheet base material and a coating layer provided on one side or both sides of the base material, wherein the coating layer is obtained by polymerizing the coating composition according to claim 1 with light and/or heat.

12. The laminate according to claim 8, wherein the film material is a film of any one kind selected from polyester film, polycarbonate film, fluorine-containing resin film, polyimide film, triacetylcellulose film, acrylic film, polystyrene film, polyvinyl chloride film, polyvinyl alcohol film, and nylon film.

13. The adhesive sheet according to claim 7, wherein the film base material is a film of any one kind selected from polyester film, polycarbonate film, fluorine-containing resin film, polyimide film, triacetylcellulose film, acrylic film, polystyrene film, polyvinyl chloride film, polyvinyl alcohol film, and nylon film.

* * * * *